United States Patent
Mennen

(10) Patent No.: US 6,884,268 B2
(45) Date of Patent: Apr. 26, 2005

(54) PROCESS FOR THE PREPARATION OF GRANULES

(75) Inventor: Johannes Henricus Mennen, Meijel (NL)

(73) Assignee: DSM IP Assets B.V., Heerlen (NL)

( * ) Notice: Subject to any disclaimer, the term of this patent is extended or adjusted under 35 U.S.C. 154(b) by 24 days.

(21) Appl. No.: 10/250,371

(22) PCT Filed: Dec. 14, 2001

(86) PCT No.: PCT/NL01/00910

§ 371 (c)(1), (2), (4) Date: Dec. 12, 2003

(87) PCT Pub. No.: WO02/057005

PCT Pub. Date: Jul. 25, 2002

(65) Prior Publication Data

US 2004/0088830 A1 May 13, 2004

(30) Foreign Application Priority Data

Jan. 17, 2001 (EP) .............................. 1017130

(51) Int. Cl.⁷ ................................. B01D 9/00
(52) U.S. Cl. ...................................... 23/300
(58) Field of Search .......... 23/313 R, 313 FB, 23/300

(56) References Cited

U.S. PATENT DOCUMENTS

| | | | |
|---|---|---|---|
| 3,600,818 A | * | 8/1971 | Lang et al. ................ 34/372 |
| 3,649,291 A | | 3/1972 | Van Elten |
| 4,145,818 A | | 3/1979 | Kulling |
| 4,219,589 A | | 8/1980 | Niks et al. |
| 4,473,438 A | * | 9/1984 | Loureiro ................ 159/4.02 |
| 5,124,100 A | * | 6/1992 | Nishii et al. ............... 264/82 |
| 5,628,800 A | | 5/1997 | Schlicht et al. |

FOREIGN PATENT DOCUMENTS

| | | |
|---|---|---|
| EP | 141436 | 5/1985 |
| EP | 570218 | 11/1993 |
| EP | 711593 | 5/1996 |
| FR | 2393779 | 1/1979 |
| GB | 1134142 | 11/1968 |

* cited by examiner

Primary Examiner—Steven Bos
Assistant Examiner—Edward M. Johnson
(74) Attorney, Agent, or Firm—Mayer, Brown, Rowe & Maw LLP

(57) ABSTRACT

Process for the preparation of granules from a liquid composition by spraying the liquid composition in the granulation zone of a granulating device onto or over solid particles present in the granulation zone that are being kept in motion, as a result of which these particles grow, and withdrawing a stream of particles from the granulation zone, yielding a stream of particles of the desired size, with a part of the air flow leaving the granulating device during granulation being returned to the granulating device. In this way only a small part of the air flow needs to be purified of the starting materials.

4 Claims, 2 Drawing Sheets

PROCESS FOR THE PREPARATION OF GRANULES

CROSS REFERENCE TO RELATED APPLICATION

This application is the National Phase of International Application PCT/NL01/00910 filed Dec. 14, 2001 which designated the U.S., and that International Application was published under PCT Article 21(2) in English.

The invention relates to a process for the preparation of granules from a liquid composition by spraying the liquid composition in the granulation zone of a granulating device onto solid particles present in the granulation zone that are being kept in motion, as a result of which these particles grow, and withdrawing a stream of particles from the granulation zone, yielding a stream of particles of the desired size.

A process for the preparation of granules from a liquid composition in which a granulating device is applied is described, inter alia, in NL-A-7806213. In this process a stream of atomizing gas is used to spray the liquid composition into fine droplets that solidify on core particles in a fluidized bed. Air is generally used as atomizing gas. The fluidized bed is kept in motion with a stream of fluidizing gas. Air is generally also used as fluidizing gas.

EP-A-141436 describes a granulation process in a fluidized bed in which the liquid composition leaves a liquid distribution device in the form of a virtually closed, conical film and in which core particles from the bed are passed through the film with the aid of a strong gas flow of so that they are wetted and can grow.

Figure 1:
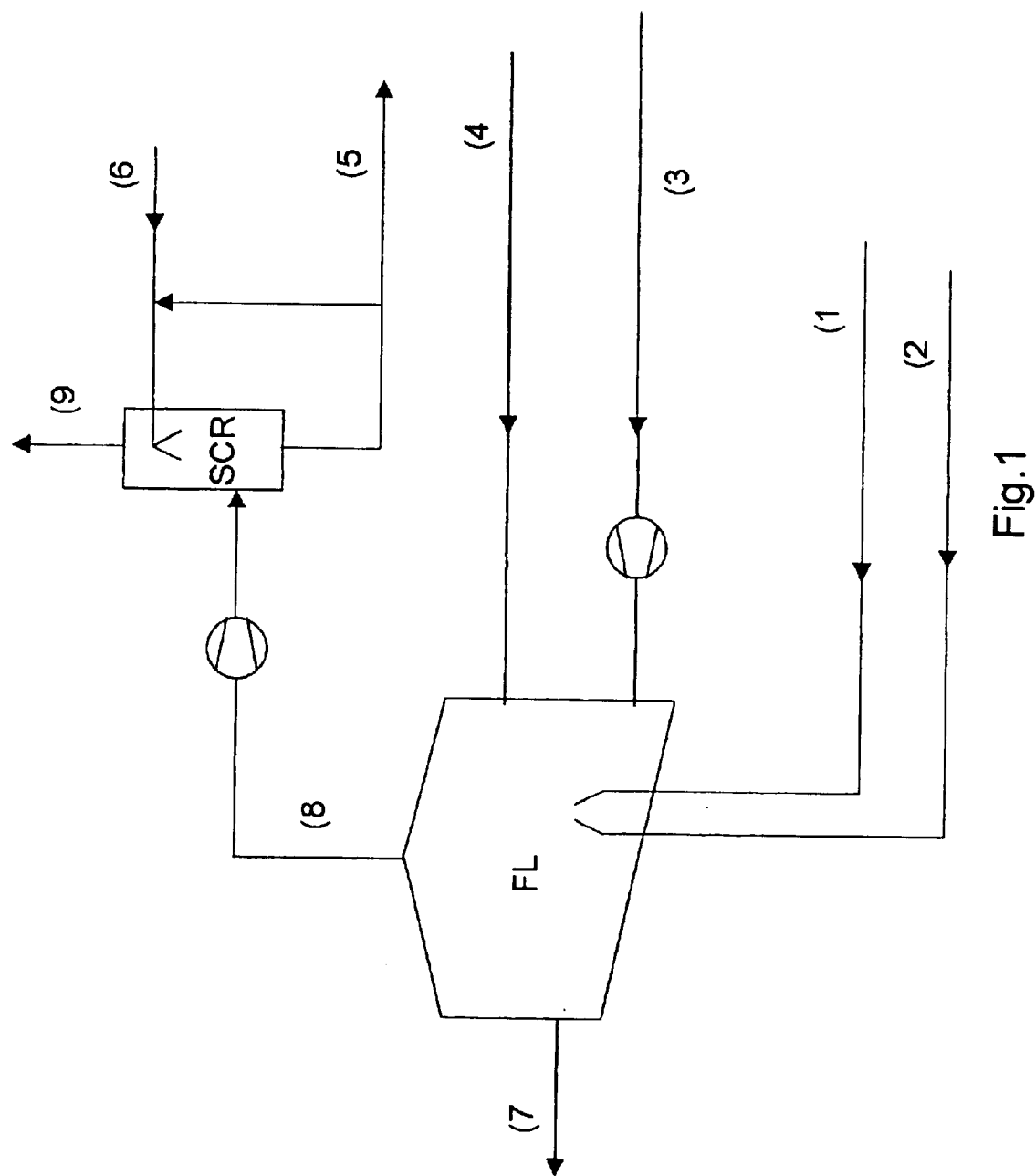
FIG. 1 is a schematic view of an air system for a conventional fluid bed granulation system.

In a granulating device a product stream is obtained which is generally split into three different flows with the aid of screens. A first stream of particles of desired size, which is transferred to the storage, a second flow of undersize product, which is returned to the granulating device for grow further growth, and a third flow of oversize product, which is likewise returned to the granulating device via a crushing device or size-reduction device. Examples of granulating devices include fluid bed and spouted bed granulators.

Together with the liquid compositions also a certain quantity of non-converted starting materials is fed to the granulating device. When for example a urea melt is granulated, it generally contains between 100 and 1000 ppm (by weight) of free ammonia. That means 100–1000 g ammonia per $10^6$ g urea melt. This ammonia ends up in the air flow that leaves the granulating device and this ammonia should be removed from this air flow before this air flow can be vented to the atmosphere.

The air flow leaving the granulating device also contains a quantity of dust, mainly originating from the product to be granulated. This dust, too, is to be removed from the air flow before this air is vented to the atmosphere.

A drawback of these granulation methods is the large quantity of air that must be used during the granulation process. The reason for this is that the heat of crystallization released in granulating devices must be removed by the fluidizing air and the atomizing air. In granulating devices according to for example the fluid bed or spouted bed principle the required quantity of air is therefore partly determined by the heat balance. Further the quantity of air is partly determined by the requirement that the bed must remain in fluidized condition. This, too, imposes a lower limit on the quantity of air to be supplied. Due to the large quantities of air an air flow is formed in which, during granulation of for example a urea melt, the concentrations of ammonia and urea dust are low but the quantities of these materials are so large that they must still be removed before this air can be vented to the atmosphere.

In a urea plant with a capacity of 750 tonnes of urea per day, for example, around 15,000 $m^3$ of atomizing air and around 85,000 $m^3$ of fluidizing air are consumed per hour. That implies that per hour 100,000 $m^3$ air must be purified in this urea plant. This approximately 100,000 $m^3$ air generally contains 500–2000 kg urea dust and 100–400 ppm (by weight) of ammonia. The latter means that 100–400 g ammonia is present per $10^6$ g air. The urea dust is removed from this air flow by scrubbing this air flow with water in a scrubbing device. The resulting urea in water solution is recirculated to the recovery section of the urea plant. From the air flow leaving the scrubbing device the ammonia still present should be removed.

The aim of the invention is to reduce the quantity of air that must be purified before it can be vented to the atmosphere. In addition, the aim of the invention is to remove dust originating from the product to be granulated and the residues of the non-converted starting materials from the air flow.

It has been found that this can be achieved by returning part of the air flow leaving the granulating device during granulation to the granulating device. Preferably between 60 and 99 vol. % of the air flow, in particular between 70 and 90 vol. %, is recirculated. As a consequence only a remaining small part of the air flow needs to be cleaned of the starting materials and dust particles before being vented to the atmosphere. Before returning this air flow to the granulating device, however, this air flow is preferably purified of the dust present in it, mainly originating from the product to be granulated, and cooled. This purification and cooling is preferably effected by contacting this air flow with water or with an aqueous solution of the substance to be granulated in water. In particular, the dust removal from the air flow and the cooling of the air flow are combined.

The advantage of the process according to the invention is that the required quantity of air that is to be purified of non-converted starting materials still present can be reduced considerably. It has been found, for example, that in a urea plant with a capacity of 750 tonnes per day the quantity of air that is to be purified of the starting materials can be reduced to 15,000 $m^3$ air per hour or less. This air flow still contains 500–2500 ppm (by weight) of ammonia. That means 500–2500 g ammonia per $10^6$ g air. It is economically more attractive to purify less air containing more ammonia than large quantities of air with a low concentration of ammonia.

Dust scrubbing in the scrubbing device takes place in the circulating air system, so that the vented air flow contains virtually no dust. The purification of environmentally harmful components such as for example ammonia in this vented air flow can take place without foreign substances being introduced into the urea plant. In principle all organic and inorganic acids can be used but also techniques such as for example adsorption/adsorption and membrane technologies are used to bind the environmentally harmful substances such as for example ammonia in the air flow to be vented.

The scrubbing device in such a circulating air flow is not only used to reduce the quantity of dust emitted to accepted values but also to cool this circulating air flow because this air flow will be used for the removal of the heat of crystallization produced during granulation. Optionally the air flow from an external product cooler can also be included in such a circulating air system.

In principle all kinds of liquid materials can be applied, in the form of a solution, a melt or a suspension. Examples of materials to be granulated are ammonium salts, such as ammonium nitrate, ammonium sulphate or ammonium phosphate as well as mixtures thereof, straight fertilizers such as calcium ammonium nitrate, magnesium ammonium nitrate, composed NP and NPK fertilizers, urea, urea-containing compositions, sulphur and the like. The invention is particularly suitable for granulating straight and compound fertilizers and in particular for granulating urea.

Further the process according to the present invention is particularly suitable for the optimization and improvement of existing plants. Both in conventional urea plants and in urea stripping plants the existing fluid bed and/or spouted bed granulators can be designed using this principle. Optimization and improvement is not limited to urea plants. All plants with one or more fluid bed granulators can be optimized in this way. The invention can further be used when building new plants.

FIG. 1 is a schematic view of the air system for a fluid bed granulation system such as currently in use. Crystallization of the product to be granulated takes place in the fluid bed granulating device (FBGD). In this fluid bed granulating device a melt of the product to be granulated, with for example a moisture content between 0.3 and 10 wt. % but preferably lower than 5 wt. %, is added to seed material via (1). Seed material consist of small crystals of the product to be granulated which are present in the granulating device and to which the sprayed melt adheres. Around this seed material crystallization of the added melt takes place. In the most common fluid bed granulating devices the melt is sprayed together with atomizing air (2) via specially designed sprayers. In addition, fluidizing air is fed to the granulating device via (3) to keep the fluid bed of the granulating device in a fluid state. The heat of crystallization released is removed via the fluidizing air and atomizing air. Before being vented to the atmosphere, the fluidizing air and atomizing air leaving the granulating device via (8) is treated in a scrubber (SCR) so as to clean this air of dust particles. For this purpose water or an aqueous solution of the product to be granulated is supplied via (6). The treatment in the scrubber of the air to be cleaned takes place using a circulating aqueous flow. From this circulating flow a constant solution of the product to be granulated is removed from the system via (5) and transferred to a subsequent processing step. The purified air is vented to the atmosphere via (9), optionally via a removal step for any starting materials still present. Via line (4) the undersize and broken coarse product is recirculated from the screens to the fluid bed. Via (7) the granulated product is transferred to the screens where the having the right diameter is separated and transferred to the storage.

Figure 2:
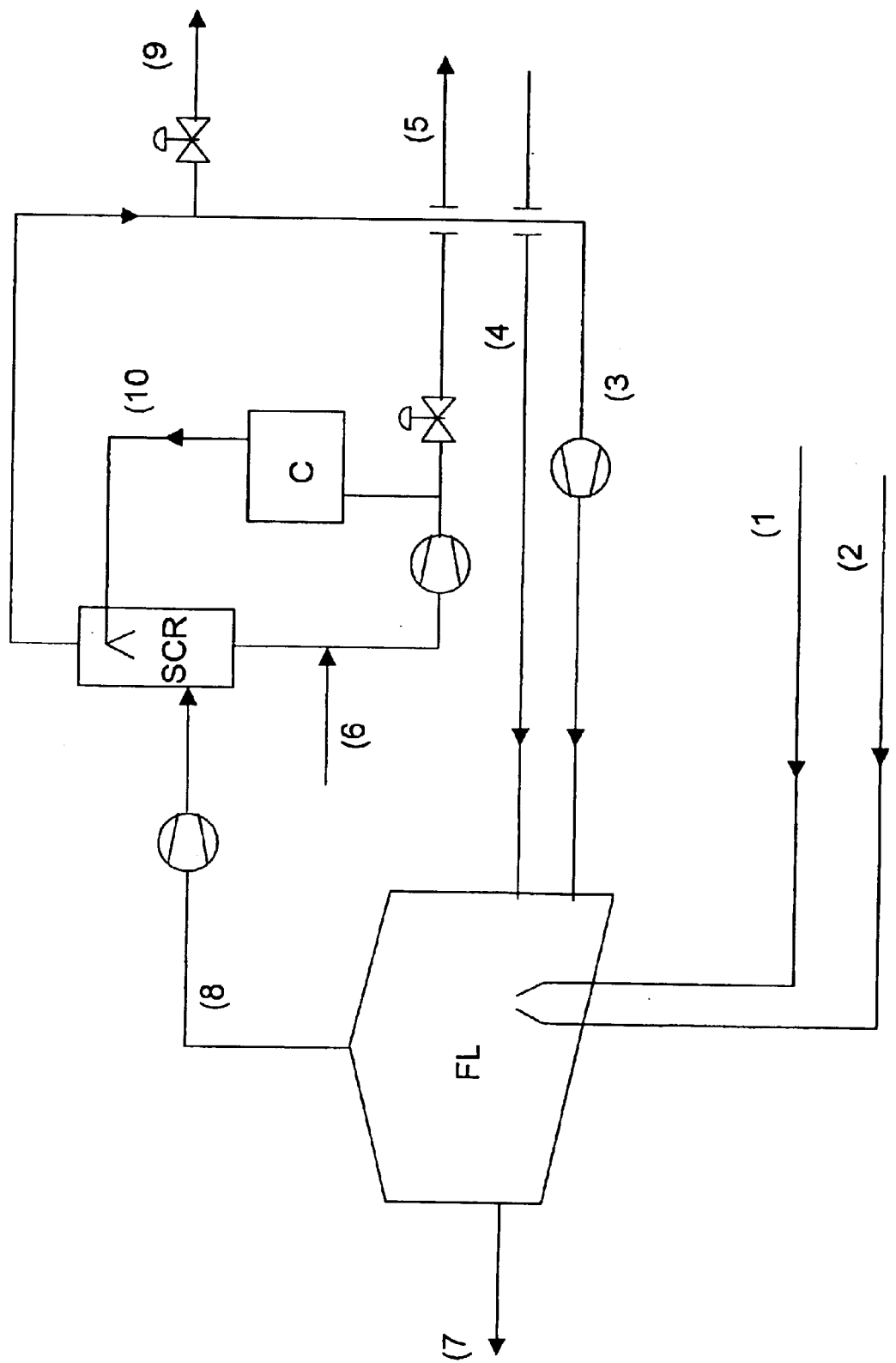
FIG. 2 is a schematic view of a fluid bed granulation system with a circulating air flow according to an embodiment of the present invention.

FIG. 2 schematically shows a fluid bed granulation system with a circulating air flow (3) according to the present invention. The air flow (8) leaving the granulating device (FBGD) is purified of dust in a scrubber (SCR). In this scrubber the air flow is also cooled, which involves intensive contact between the air and an aqueous flow (10). The heated water flow is cooled in a cooler (C), after which this flow is reused as scrubbing medium and coolant in the scrubber. A blowdown flow (5) prevents the content of dissolved or suspended dust in the circulating water flow (10) from becoming too high. The blowdown flow, in which a considerable concentration of product is present, is returned to the further recovery section. The cooled air flow leaving the scrubber (SCR) is used for fluidizing air (3) in the fluid bed granulating device. Optionally a part of this air can also be used as atomizing air (2) for the sprayers. A small part of the air that has been purified of dust is vented to the atmosphere via (9). However, before this air is vented to the atmosphere if necessary the environmentally harmful substances such as for example ammonia can be removed from this air flow, which can be effected by applying all kinds of techniques such as for example the use of organic or inorganic acids or by making use of adsorption/absorption or membrane techniques. Via (1) the melt to be granulated is supplied and via (4) the undersize or broken coarse product from the screens. Via (7) the granulated product is removed.

The invention will be elucidated on the basis of the following examples.

EXAMPLE I AND COMPARATIVE EXAMPLE A

In example I and comparative example A the urea melt in a urea plant with a capacity of 750 tonnes a day is granulated in a granulating device schematically shown in the FIG. 1 (prior art) and FIG. 2 (present invention). Tables 1 and 2 below present the compositions of the various process streams. Table 1 according to a process shown in FIG. 1 and table 2 according to a process as shown in FIG. 2. The quantities of ammonia are shown as ppm (by weight), in other words the number of grams of ammonia per $10^6$ g solid or gas.

TABLE 2

| | Flow in kg per hour | Urea | Water | Ammonia ppm | Temperature in ° C. |
|---|---|---|---|---|---|
| (1) | 34,790 | 98 wt. % | 2 wt. % | 800 | 135 |
| (2) | 15,000 | 0 | 420 kg/h | 0 | 135 |
| (3) | 85,000 | 0 | 2380 kg/h | 1638 | 30 |
| (4) | 17,300 | 99.75 wt. % | 0.25 wt. >5 | 100 | 40 |
| (5) | 3700 | 1476 kg/h | 2324 kg/h | 0 | 45 |
| (6) | 1600 | 0 | 1600 kg/h | 0 | |
| (7) | 50,000 | 99.75 wt. % | 0.25 wt. % | 100 | 98 |
| (8) | 100,000 | 1476 kg/h | 3414 kg/h | 1638 | 105 |
| (9) | 15,000 | 0 | 420 kg/h | 1638 | 30 |
| (10) | 85,000 | 40 wt. % | 60 wt. % | 0 | 20 |

TABLE 1

| | Flow in kg per hour | Urea | Water | Ammonia ppm | Temperature in ° C. |
|---|---|---|---|---|---|
| (1) | 34,790 | 98 wt. % | 2 wt. % | 800 | 135 |
| (2) | 15,000 | 0 | 420 kg/h | 0 | 135 |
| (3) | 85,000 | 0 | 2380 kg/h | 0 | 30 |
| (4) | 17,300 | 99.75 wt. % | 0.25 wt. % | 100 | 40 |
| (5) | 5176 | 1476 kg/h | 3700 kg/h | 0 | |
| (6) | 3700 | 0 | 3700 kg/h | 0 | |
| (7) | 50,000 | 99.75 wt. % | 0.25 wt. % | 100 | 98 |
| (8) | 100,000 | 1476 kg/h | 3414 kg/h | 246 | 105 |
| (9) | 100,000 | 0 | | 246 | |

What is claimed is:

1. Process for the preparation of granules from a liquid urea-containing composition by spraying the liquid composition in the granulation zone of a granulating device onto or over solid particles present in the granulation zone that are being kept in motion by an air flow through the granulation zone, as a result of which these particles grow, and withdrawing a stream of particles from the granulation zone, yielding a stream of particles of a desired size, wherein, during granulation, between 70 and 90 vol. % of the air flow leaving the granulating device is returned to the granulating device, and the remaining part of the air flow is vented to the atmosphere.

2. Process according to claim 1 wherein before this air flow is returned to the granulating device, this air flow is purified of dust present and wherein the air flow is cooled.

3. Process according to claim 2, wherein this purification and cooling takes place by contacting this air flow with water or with an aqueous solution of the substance to be granulated in water.

4. Process according to claim 3, wherein the removal of dust from the air flow and the cooling of the air flow are combined.

* * * * *